Fig. 1

Inventor.
Lawrence D. Ninneman

Inventor.
LAWRENCE D. NINNEMAN
By Philip M. Rice
& W. A. Schaich
ATTORNEYS

United States Patent Office 3,453,353
Patented July 1, 1969

3,453,353
METHOD AND APPARATUS FOR BLOW MOLDING PLASTIC ARTICLES
Lawrence D. Ninneman, Toledo, Ohio, assignor to Owens-Illinois, Inc., a corporation of Ohio
Filed Oct. 5, 1965, Ser. No. 493,191
Int. Cl. B29d 23/02, 23/03
U.S. Cl. 264—97                                      12 Claims

ABSTRACT OF THE DISCLOSURE

A method and apparatus for blow molding plastic containers utilizing a rotatable table having two diametrically spaced parison core means. The two parison cores are served by an injection molding station for successively forming parisons about said cores. A single blow mold reciprocates between said cores to provide a completely overlapped operation.

---

The present invention relates to a method of and apparatus for blow molding plastic articles. More particularly, this invention relates to a novel apparatus and method for blow molding plastic containers or the like from inflatable parisons by utilizing a single transferable blow mold within which are inflated successive parisons formed at a plurality of parison-forming stations.

Various types of blow molding methods and apparatus have been evolved for the formation of plastic articles, such as containers. Such methods and apparatus typically form a blowable bubble or parison by either extruding a tube which is subsequently pinched shut and blown in the blow mold, or injection molding or otherwise forming a closed-end blowable shape which is merely inflated in the blow mold.

Various methods of manipulating the parison-forming and blow molding portions of the complete article forming apparatus have been proposed. For example, the blow molds can be mounted on a rotatable table to receive extruded or injection molded parisons at a fixed parison-forming station, the blow molds traveling arcuately through successive blowing, cooling and ejecting stations as the table indexes rotationally. Alternatively, the blow molds can be positioned adjacent an extrusion orifice from which the parison is extruded, the molds closing on the extruded parison and then moving, preferably vertically, away from the orifice as a subsequent tubular parison is extruded. Uniformly, such apparatus has required at least one blow mold for each parison-forming station, or (in the case of a multi-station rotary machine) a blow mold for each station, since the parison must be enclosed within the blow mold while it is in a plasticized state capable of expansion upon the introduction of blow air. The blow molds are necessarily in the form of at least two closable sections which cooperatively define an interior cavity corresponding to the shape of the article to be formed and the molds must be cooled by water or the like. As a result, a large part of the investment in any blow molding operation is in the provision of the blow molds, themselves. Since an efficient blow molding machine of the type heretofore proposed must incorporate a number of blow molding and cooling stations, a corresponding number of blow molds have been required, and the initial blow mold investment and the tooling investment necessary to any change in container size or shape has been appreciable.

The present invention provides a new and novel machine and method for the blow molding of plastic articles such as containers or the like, and wherein both the initial investment and the "change-over" tooling charge for blow molds is reduced to a minimum by utilizing a single set of blow molds for a plurality of parison-forming stations.

Thus, the present invention provides substantial economies in a multi-station blow molding machine which is fully overlapped, i.e. in which forming operations are being concurrently carried out at different stations, while at the same time the major tooling investment, i.e. in the blow molds themselves, is minimized.

These advantages are obtained by the utilization of a blow mold which "travels" or "shuttles" between a pair of parison-forming stations. Preferably, the apparatus of the present invention is of the table type wherein one or more tables rotate or oscillate about a central vertical axis and wherein each of the tables carries a plurality of parison-forming means, such as container neckmolds. At a fixed parison-forming station adjacent the periphery of the table is located a parison mold which registers, in succession, with the parison neckmolds, as the table is indexed.

In operation, the neckmolds are lowered into contact with the parison-forming mold, the parison is formed, and the neckmolds are then raised to expose the parison above the forming station. Next, the parison is enclosed within the closable sections of a blow mold, the table is then indexed with the neckmold and the blow mold moving therewith. The parison is inflated either before, during or after movement of the table, and subsequently a second set of neckmolds is positioned at the parison-forming station. During the formation of the second parison, the first-formed parison is cooling in the blow mold at a location remote from the parison-forming station. Following or during the formation of the parison, the blow mold is opened to expose the now blown and cooled bottle, the blow mold is transferred by movement relative to the table and is then closed on the parison which has just been formed, so that this parison can now be inflated.

By moving the parison with the table, i.e. between the parison-forming station and one or more article cooling stations, a completely overlapped operation can be obtained, i.e., while one parison is being formed, a previously formed parison is being cooled.

By shifting the blow mold relative to the table, a single blow mold can service two parison-defining means, i.e. the blow mold closes onto a parison so that this parison can be inflated, the blow mold travels arcuately with the plate and the parison to a cooling location; while another parison-forming mechanism is being positioned at the parison-forming station, the blow mold stays closed while the next parison is being formed, and the blow then moves relative to the table to enclose the newly formed parison after the blow mold has been opened to expose the completed article.

Thus, the blow mold is capable of a plurality of individually rotary and translatory movements which must be carefully correlated to carry out the method of the present invention. First, the blow mold sections must be able to open and close relative to one another; second, the blow molds must be displaceable arcuately with the table and with the parison neck molds to accommodate blowing and cooling of the parison; and, thirdly, the blow molds must be transferable between the parison stations.

It is, therefore, an important object of the present invention to provide a new and novel apparatus for blow molding a plurality of plastic articles in efficient, economical, overlapping relation with a minimum of tooling investment and requirement.

Another important object of the present invention is to provide a method of an apparatus for manufacturing plastic containers and the like, and wherein a single blow mold assembly is provided to accommodate the inflation of a plurality of successively formed inflatable parisons formed at a plurality of forming stations.

It is a further object of this invention to provide a novel blow molding apparatus wherein a rotatable table is provided with a plurality of parison stations between which a blow mold travels to provide an overlapped forming machine with a minimum of investment.

Yet another, and no less important, object of the present invention is the provision of a method of making a blow plastic article wherein a blow mold moves actuately with a forming table to accommodate the inflation and cooling of a finished parison and then is displaced relative to the table to receive therein a subsequently formed parison which, in turn, is inflated and cooled by joint, arcuate blow mold-parison movement.

Other objects of this invention will appear in the following description and appended claims, reference being had to the accompanying drawings forming a part of this specification wherein like reference characters designate corresponding parts in the several views.

As shown on the drawings.

1-xfflirig68ag-.wu ,iiufflzffl zfflz fflzfflfflflfflfl fflzfflfflflfflfl flfflfl

THE EMBODIMENT OF FIGURES 1 THROUGH 9

Figure 1:
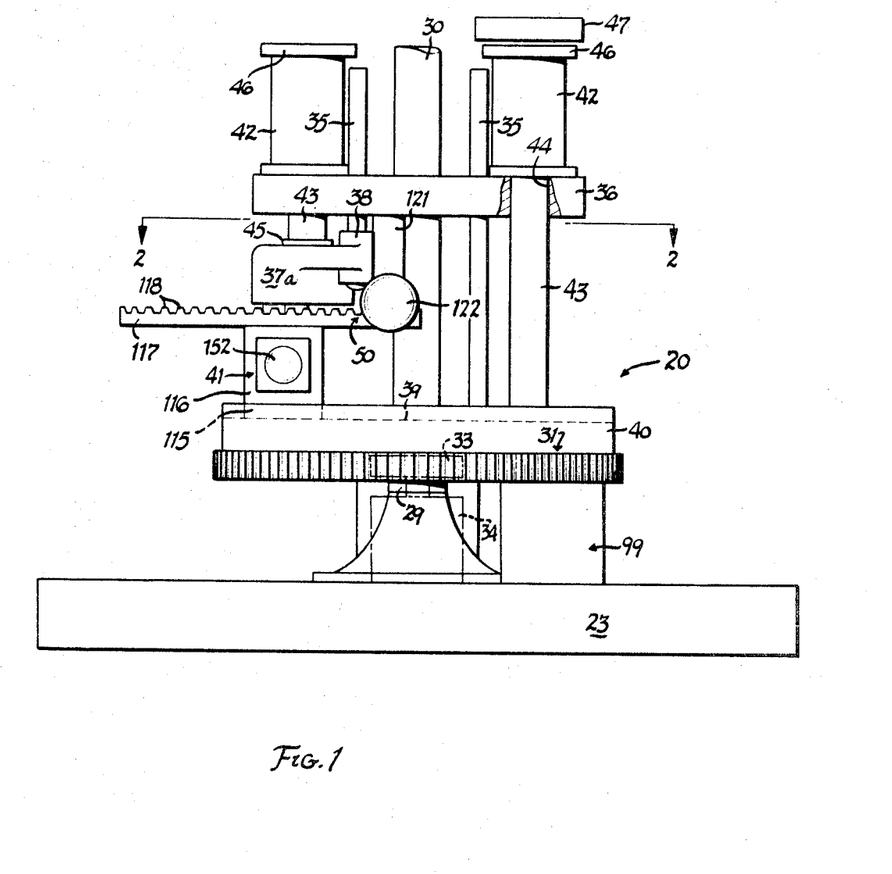
FIGURE 1 is a schematic side elevational view of a machine of the present invention, capable of carrying out the method of the present invention.

In FIGURE 1, reference numeral 20 indicates generally an apparatus of the present invention, including a base plate 23 supporting, through a bearing 29, a vertically extending, centrally located, freely oscillatable shaft 30.

Secured to the freely movable shaft 30 is a radially extending, arcuately actuatable table, indicated generally at 31, and circumscribed by a ring gear 32. The horizontal table 31 and the ring gear 32 are spaced vertically above and extend parallel to the fixed base plate 23. The ring gear 32 meshes with a pair of pinions 33 rotationally driven by suitable means, as by hydraulic motors 34. Rotation of the pinions 33 by means of the motors 34 will cause the table 31 to rotate, or, more particularly, to oscillate by engagement of the pinions 33 with the ring gear 32, the direction and extent of such movement being determined primarily by the direction and extent of actuation of the motors 34.

An upper or top plate 36 is carried by the shaft 30 for oscillation therewith, this top plate 36 being above and generally parallel to the table 31. Slidably carried by the top plate 36 (which rotates with the table 31) are a plurality of vertically upstanding posts 35 which serve to guide the vertical displacement of a pair of neck ring crossheads 37 and 37a which are identical in construction and configuration.

The table 31 carries on its upper surface spaced pairs of parallel guides 40 which serve to confine for translatory movement a blow mold assembly, generally designated 41. The blow mold assembly 41 can be actuated, i.e. periodically linearly translated, by a rack assembly 50 between the two crossheads 37 and 37a in a manner to be hereinafter more fully explained.

THE PARISON FORMING MECHANISM

Figure 2:
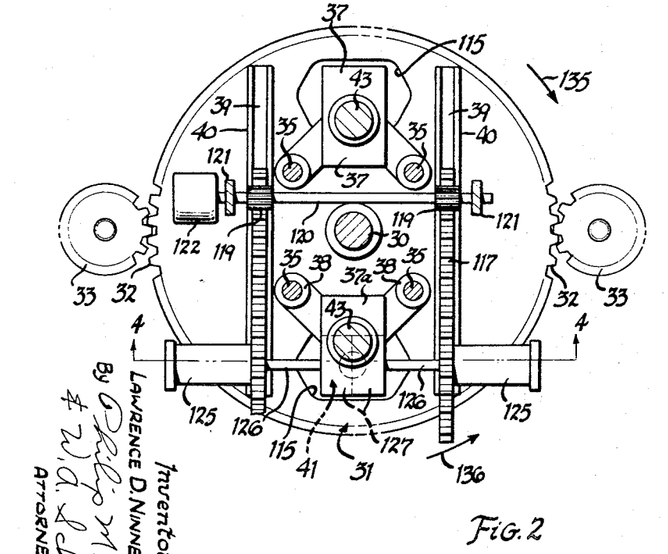
FIGURE 2 is a sectional view taken along the plane 2—2 of FIGURE 1.
Figure 3:
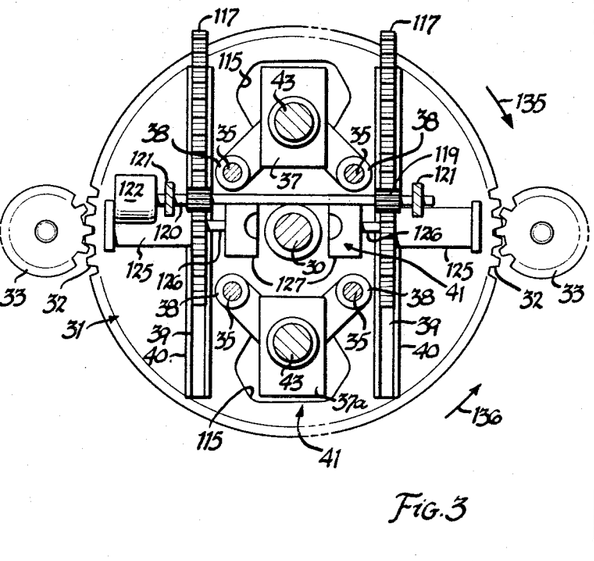
FIGURE 3 is a sectional view similar to FIGURE 2, and illustrating the apparatus in an adjusted position.

As shown in FIGURES 1 through 3, the crossheads 37 and 37a are each provided with laterally spaced, vertically projecting sleeves 38 integral with the crossheads, respectively, and serving to secure the crossheads to the rods 35 to accommodate vertical displacement of the crossheads as the rods 35 are slidably displaced through slide bearings (not shown) in the top plate 36.

The crossheads are actuated vertically for independent movement relative to one another and relative to the table 31 by means of fluid pressure actuated cylinders 42 (FIGURE 1) which surmount the top plate element 36 (being secured thereto by bolts or the like) to project freely vertically thereabove. The piston rods 43 of the cylinders 42 project vertically downwardly through apertures 44 in the plate 36 for attachment, as through attaching blocks 45, to the crossheads 37 and 37a respectively.

It will be noted from FIGURE 1 that the upper ends of the cylinders 42 each terminate in an abutment block 46. The frame (not shown) carries a fixed abutment block 47 which is located in vertical alignment with the block 46 of the one cylinder 42 which is positioned at the parison-forming station, i.e. the right-hand cylinder as illustrated in FIGURE 1. Normally, the upper surface of each of the abutments 46 carried by the cylinders 42 is at an elevation slightly spaced from the elevation of the abutment block 47. This distance is on the order of a few thousandths of an inch but is sufficient to accommodate relative movement between the abutments 46, 47 when the table 31 is indexed. Upon actuation of either of the cylinders 42 to extend the corresponding piston rod 43 downwardly, as will be hereinafter explained, the crosshead 37 is actuated downwardly to be bottomed against a vertically fixed parison mold, as later explained. The resultant reaction force in the piston rod 43 tends to displace the corresponding cylinder 42 vertically upwardly. The upper plate 36 of the rotatable carriage is of relatively light construction in order to reduce the over-all arcuate momentum of the carriage assembly and this plate 36 can deflect vertically upwardly through at least the normal dimension, separating the abutments 46, 47 so that the abutment block 46 of the one cylinder abuts the aligned block 47. Thus, the clamping load imposed on the corresponding piston rod 43 is transferred to the massive frame (not shown) and this clamping load need not be borne by the rotatable carriage.

One suitable crosshead is disclosed in a co-pending United States patent application, Ser. No. 410,343, assigned to the assignee of this invention now patent No. 3,357,045 to Ninneman.

While the fingers and description of the present application are directed to a single injection mold-core pin assembly carried by each crosshead, two or more such assemblies could be so carried in a like manner shown and described in said co-pending application for United States Letters Patent.

One or more core pins 83 (FIGURE 4) are carried by each crosshead 37 and 37a for relative reciprocable movement thereto by actuation of a core pin cylinder (not shown). Injection mold core pin 83 may be of any exterior shape and will generally be provided with temperature control means for heating and/or cooling the pin. Each such core pin 83 is equipped with a selectively openable valve 84 to accommodate inflation of a parison for purposes hereinafter explained.

Each pin 83 is interposed between a partable neck or injection finish mold 85, the sections of which are relatively movable to open and closed positions by suitable means (not shown but described in the above identified co-pending application Ser. No. 410,343). Each such partable neckmold or finish mold 85 comprises sections 90 which have semi-cylindrical interior faces 94 provided with finish-defining recesses and positioned adjacent, but in radially spaced relation to, the exterior surface of core pin 83. These neckmold sections 90 are, as stated, transversely movable relative to the pin 83 and also relative to a neckmold ring 96 which has a lower surface 98 guiding the neckmold section 90 for transverse movement.

Located beneath the table 31, at a location coinciding with and vertically aligned with the head 37 of the machine as positioned according to FIGURE 1 of the drawings, is a parison-forming mechanism, indicated generally at 99 (FIGURES 1 and 4 through 7). Preferably, this parison-forming mechanism 99 is substantially identical to that heretofore described in said application Ser. No. 410,343, and comprises a plasticizer-extruder, indicated generally at 101, of more or less conventional type and supplying plasticized material under pressure through a reservoir passage, indicated generally at 102.

This plasticized material is supplied to an outlet passage 103 under the control of the reciprocating valve 104. A vertical supply passage 105 receives such material when the valve 104 is opened or retracted (FIGURE 5) to supply such material to a parison mold cavity 106 provided in a parison mold, indicated generally at 107. The vertically movable ram 110 fits in the passage 105 and serves to displace material filling the passage 105 into the cavity 106 as the ram is elevated (FIGURE 6).

Figures 4, 5:
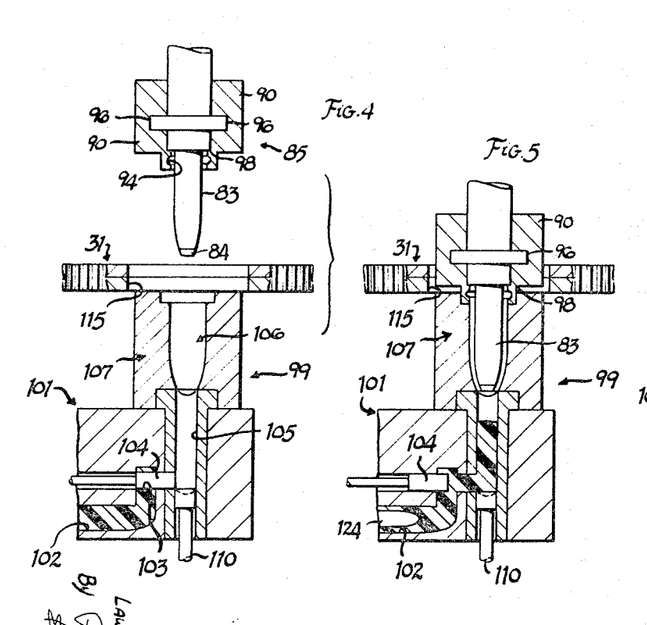
FIGURES 4 through 8, inclusive, are schematic sectional views taken along the plane 4—4 of FIGURE 2, and illustrating in sequence the steps of the method as carried out by the apparatus.
Figure 6:
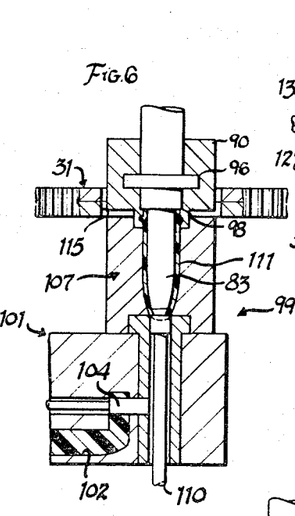

The parison 111 (FIGURE 6) is injection molded about the core pin 83, as best seen in FIGURE 6, after the core pin has been lowered through the aperture 115 in the plate 31 by actuation of the cylinder 42 to lower the crosshead 37 to the position illustrated in FIGURES 5 and 6. This is substantially the identical operation as set forth in said co-pending application, Ser. No. 410,343, and this operation, as such, forms no part of the present invention.

THE BLOW MOLD STRUCTURE

Referring now to FIGURES 1 through 3, it will be seen that the spaced pairs of parallel guides 40 carried by the upper surface of the table 31 extend along chords of the circular table 31, each such pair of guides 40 defining therebetween a trackway 39 into which project the lower ends 115 of blow mold section guide plates 116. These guide plates 116 are generally rectangular in configuration and bear at their upper surfaces transversely extending, elongated racks 117 comprising upstanding teeth 118 which mesh with pinions 119, respectively. These pinions 119 are joined by a common shaft 120 journaled in depending support arms 121 carried by the top plate 36, the shaft being driven by a reversible electric motor 122.

It will be appreciated that actuation of the motor 122 will rotate the shaft 120 and the pinions 119 mounted thereon, and that rotation of the pinions meshing with the teeth 118 of the racks 117 will move the guide plates 116 in the grooves 39, the lower ends of the guide plates being confined by the guides 40. The direction of movement of the racks and the plates secured thereto is determined by the direction of rotation of the motor 122.

Figure 8:
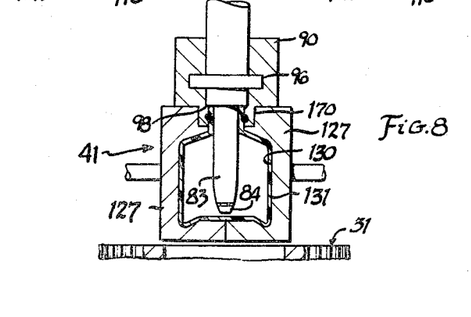
Figure 9:
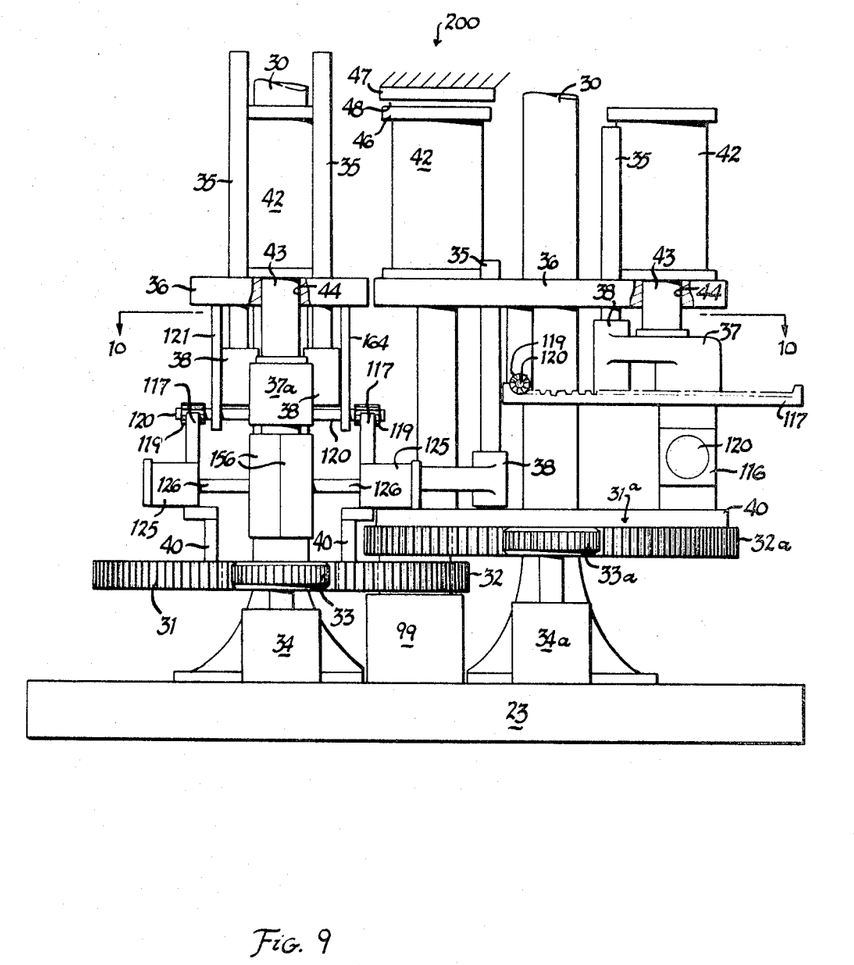
FIGURE 9 is a view similar to FIGURE 1 but illustrating a modified form of apparatus of the present invention.

Each of the guide plate 116 has mounted thereon a fluid pressure actuated mold section cylinder 125, the piston rod 126 of which projects through the plate to carry at its free end a blow mold section 127 of the blow mold assembly 41. The two blow mold sections 127 are complementary, i.e. the mold sections, when in abutting relationship (as illustrated in FIGURE 2 and in FIGURE 8) define an interior mold space 130 conforming to the contour of the final blown article 131 to be formed by practicing the method of the present invention.

OPERATION OF THE EMBODIMENT OF FIGURES 1 THROUGH 8

Referring now to FIGURES 2 and 3 of the drawings, it will be seen that the plate 31 is oscillated by actuation of the hydraulic motors 34 through the intermeshing pinions 33, and the ring gear 32 moves through an arc of 180 degrees in a clockwise direction (indicated by directional arrow 135) from a first position to a second oscillated position, and then is returned in a counterclockwise direction (as indicated by directional arrow 136) to its initial position of FIGURE 2. Oscillation is generally preferred to rotation in forming mechanisms of this type in view of the possible simplification of fluid supply lines, electrical conduits and the like, and since positive motion limiting stops can be provided, although a clockwise or counterclockwise rotation through 360 degrees is perfectly feasible, but merely non-preferred.

Assuming initially that the device is in its position of FIGURES 1 and 2, it will be seen that the head 37 is lowered by actuation of the cylinder 42, so that the parison core 83 projects into the parison mold recess 106 through the plate aperture 115, while the head 37a is elevated.

FIGURES 5 and 6 illustrate the position of the neckmold 85 of the head 37 in this lowered, parison-forming position. After this position has been assumed, plasticized material in the passage 102 flows into the passage 105 upon retraction of the valve 104 to its position of FIGURE 5, and the valve 104 is closed after a sufficient amount of plastic to form the parison has entered the passageway 105 under the pressure of the accumulator piston 124.

Next, the plunger 110 is raised to displace the plasticized material in the passage 105 into the parison mold cavity 106. Such displacement of the plasticized material fills the neck ring recesses 94 and the space intermediate the sleeve 83 and the parison mold recess 106, thus injection molding the blowable parison 111. Next, the neckmold 85 is elevated to raise the injection molded parison 111 from the parison mold cavity 106. This operation is best illustrated by comparison of FIGURES 6 and 7, and from such a comparison it will be seen that the mold 85 is elevated above the plate 31, retracting the mold from the aperture 115, and positioning the injection molded parison 111 at a level above the plate, this level conforming to the level of the blow mold cavities 130.

While the injection molding of the parison has been carried out by the performance of the steps illustrated in FIGURES 4 through 6 on the head 37, the blow mold sections 127 have been closed beneath the head 137a and have been positioned at the cooling station which is located 180 degrees across the plate 31 from the injection molding or parison-forming station which is aligned with the block 99. Of course, the function of the blow molds is performed by actuation of the cylinders 125 to close the blow mold sections 127 upon the previously formed parison, followed by inflation of the parison through the injection molded neck thereof, which is still confined in the neckmold cavity 94 (not shown) of the neckmold assembly 85 carried by the head 37a.

Figure 7:
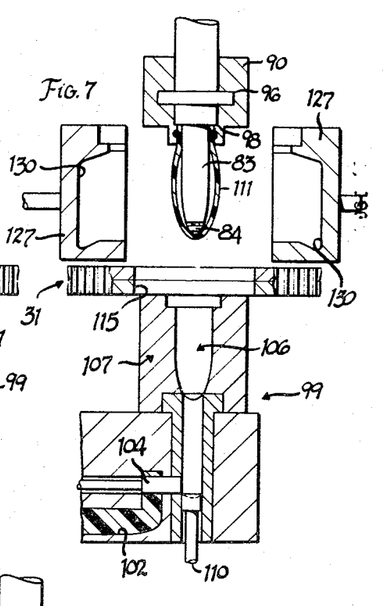

At some time previous to the assumption by the head 85 of its position illustrated in FIGURE 7, the blow mold sections 127 have been opened, the motor 122 has been actuated, and the pinions 119 rotated to move the racks 117 and the associated mold sections 127 along the guide tracks 39 to position the blow molds to either side of and in transverse alignment with the injection molded parison 111. When this position (as illustrated in FIGURE 7) has been attained, it is only necessary to close the blow mold sections 127 on the parison in order that the parison may be inflated interiorly thereof, as illustrated in FIGURE 8 of the drawings, thereby forming the blown container.

Before closure of the blow molds, and preferably during upward movement of the neckmold assembly 85, the injection molded parison 111 is preferably partially inflated or "puffed" (again, as illustrated in FIGURE 7 of the drawings) so that the parison is out of contact with a major outer surface of the core pin 83, all as is described in said application for United States Letters Patent, Ser. No. 410,343.

Such inflation of the parison serves to strip the parison from the core pin, thus facilitating later blowing, tends to reduce the chilling of the interior surface of the parison by its contact with the metallic core pin 83, and provides better thermal and dimensional control over the parison 111 after injection molding and immediately prior to blow molding thereof.

After the parison has been elevated, the blow mold sections 127 are closed and the parison is blown to the configuration of the blow mold cavity 130 to form the final container 131, it is necessary to chill the blow molded container to a final, dimensionally stable state.

In order to increase the productivity of the machine and to obtain a true "overlapped" operation as heretofore described, the motors 34 are preferably actuated at this time so that the pinions 33 and the ring gear 32 can, by their engagement, arcuately displace the table 31 through an arc of 180 degrees. By such actuation, the relative positions of the head 37 and the head 37a are reversed. During the period that the blow mold sections 127 have been traversing the table in their transit from head 37a to head 37, during the closure of the blow molds upon the injection molded parison 131 at the parison-forming station, and during the initial blowing of the container at the head 37, the neck ring sections 90 of the head 37a have been opened and the previously blown and chilled container 131 formed at the head 37a has been removed therefrom and the neck ring sections have been re-set to the positions illustrated in FIGURE 4. Thus, the 180° traverse of the table 31 in the direction 135 positions the previously utilized parison core pin 83 of the head 37a at the parison-forming station, and the steps of FIGURES 4 through 7 now are performed with the head 37a.

During the performance of these steps of FIGURES 4 through 6, the blow mold sections 127 remains closed upon the previously formed and blown parison 111, so that the article 131 is chilled interiorly of the blow mold.

During the formation of an inflatable parison at the head 37a, the head 37 is elevated to the position of FIGURE 7, the blow molds are opened to accommodate the removal of the blown article 131 and the blow molds are traversed diametrically across the plate 31 to enclose the immediately previous injection of the parison 111a.

Thus, it will be seen that the present invention provides a 2-station machine, one such station serving as the parison-forming station at which the blowable bubble or parison 111 is injection molded, the other station serving as a cooling station at which the inflated parison, i.e. the finished blown article 131, is chilled to a self-sustaining, dimensionally stable state. The blow mold sections 127 are movable along the tracks 39 (which extend chordally of the circular plate 31) diametrically of the plate 31, so that the parison 111 can be enclosed immediately after injection molding, thereby preventing any chilling of the parison after injection molding and before blow molding by reducing the time of exposure of the parison to the ambient atmosphere. Further, the enclosure of the parison in the blow mold prior to transfer of the parison to the cooling station prevents the subjection of the parison to any differential cooling during its motion through the ambient atmosphere while fully exposed.

Further, it will be noted that the blow molds move with the plate during its oscillatory motion, since the blow molds are at this time closed upon the blown article 131 and the blow molds move relative to the plate only during the periods when the plate is stationary, i.e. with the heads 37 and 37a at their respective fixed stations.

THE EMBODIMENTS OF FIGURES 9 THROUGH 14

In that embodiment of the invention illustrated in FIGURES 9 through 14, the structure and operation of the above described embodiment of the invention of FIGURES 1 through 8 is incorporated, but with several significant changes. Generally, it will be noted that the device of FIGURES 9 through 14, as indicated generally at 200, incorporates a pair of tables 31, 31a, each of which tables is provided with substantially all of the structure heretofore described for parison formation and blow molding operations. Further, it will be noted that the tables 31, 31a, have overlapping peripheral portions so that a portion of each table 31, 31a, overlies a common parison station, indicated at 99.

Figure 10:
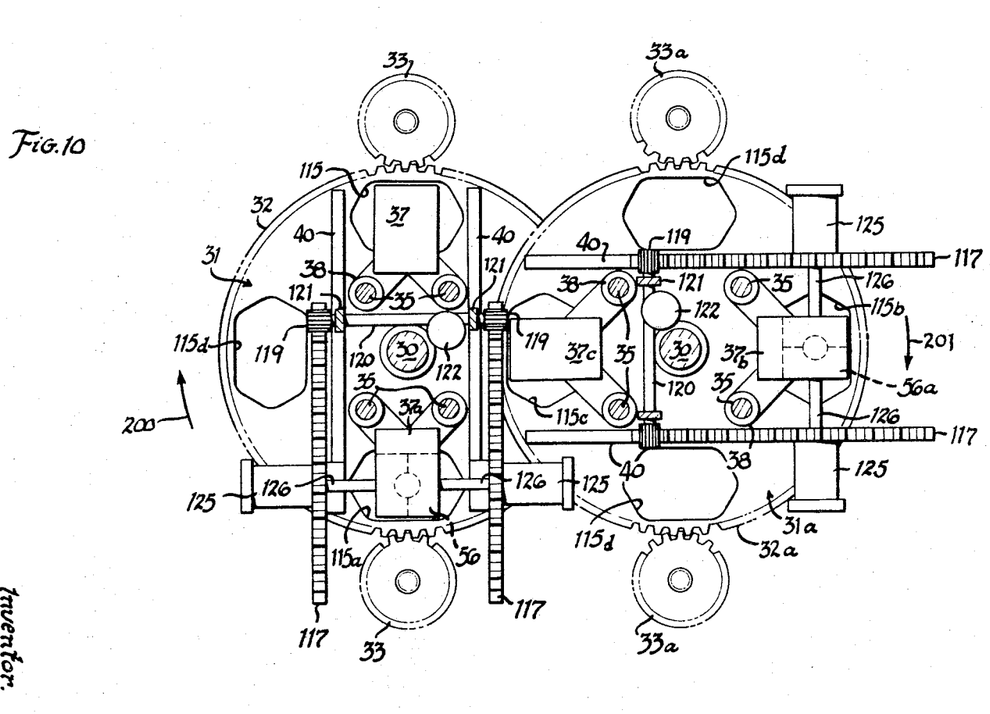
FIGURE 10 is a sectional view taken along the plane 10—10 of FIGURE 9.

Each table further is provided with its own drive mechanism for arcuately displacing the respective table. Thus, table 31 is driven by the hydraulic motor 34 through the pinions 33 meshing with the table ring gear 32, while table 31a is driven by motors 34a, pinions 33a and ring gears 32a. While the table 31 of the embodiment of FIGURES 1 through 8 was oscillated through a total arc of about 180 degrees, each of the tables of FIGURES 9 through 14 is driven rotationally for full circular movement; both tables (as indicated in FIGURE 10 by reference numerals 200, 201) are driven in a counterclockwise direction when viewed from above. Further, each table is movable from each of four indexed positions to the next indexed position through an arc of 90 degrees. Since each table bears two head assemblies (table 31 having head assembly 37, 37a and table 31a having table assemblies 37c, 37b) and each head must be individually presented to the parison forming station 99, this 90 degree index is necessary.

Each table 31, 31a carries a single blow mold assembly 41, 41a respectively, which blow mold assemblies are displaceable diametrically across each table on the guides 40 by the appropriate pinion and rack driving arrangement as above described. Additionally, each blow mold 56, 56a comprises separate sections individually openable and closable by fluid pressure actuated cylinders 125.

Since the tables overlap at the parison forming station 99, each head 37, 37a can be presented to the parison station only by being lowered through registering apertures formed in each table. Each table thus has a pair of primary apertures 115 and 115a, 115b and 115c through which the respective heads 37 through 37c can be lowered, and these apertures are diametrically opposed on the respective plates 31, 31a from one another. Additionally, apertures 115d are provided on each plate intermediate the primary apertures to actuate the displacement of each head 37, 37c, through both plates as each head, in turn, comes into registry with the parison forming station.

Thus, the dual plate embodiment of FIGURES 9 through 14 is obviously a "double" or "duplicated" version of the structure disclosed in conjunction with FIGURES 1 through 8. Thus, it is not believed necessary to again describe all of the structure in detail.

THE OPERATION OF THE EMBODIMENTS OF FIGURES 9 THROUGH 14

Bearing in mind the structure hereinafter described and referring to FIGURES 1 through 14, the operation of this embodiment of the invention would be immediately obvious.

Initially, it will be noted that the plates 31, 31a are rotationally indexed relative to one another, so that the injection heads 37a through 37c are presented in succession to the common injection station located at the overlapping area of the plates. Thus, a parison is formed for each 90 degree index of each plate but, so far as each plate is concerned, each plate is indexed 180 degrees (in two separate 90 degree indexing movements) for each parison formed at that plate.

Figure 11:
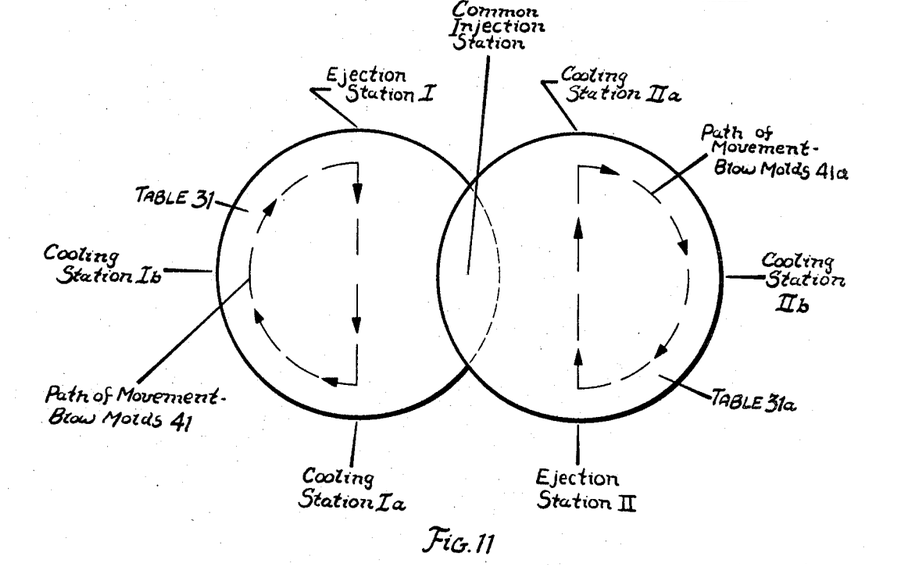
FIGURES 11 through 14, inclusive, are schematic elevational views of the apparatus of FIGURES 9 and 10, illustrating the operation of this embodiment of the invention.

As indicated in FIGURE 11, table 31 thus moves through four stations spaced 90 degrees apart and including (1) the common injection station, (2) a first cooling station, Ia, (3) a second cooling station Ib, and (4) an ejection station I. While the cooling table 31a is also moving through four stations, namely, (1) the common injection station, (2) cooling station IIa and (3) cooling station IIb and (4) ejection station II.

Figure 12:
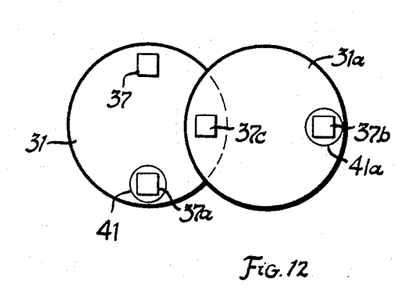
Figure 13:
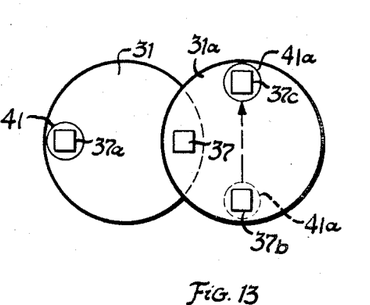
Figure 14:
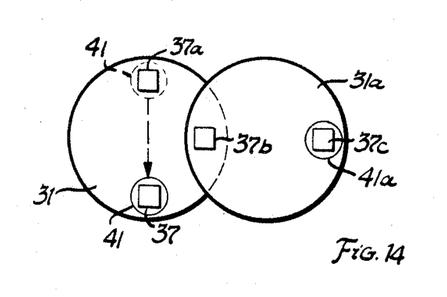

In the diametrical representation of FIGURES 12 through 14, the blow mold assembly 41, 41a are represented by circles while the cross heads 37, 37a, 37b, 37c are represented by rectangles, and it will be seen that cross heads are alternately presented to the common injection station from each of the two tables.

The path of the blow mold assemblies 41, 41a is indicated by directional arrows in FIGURE 11 from which it will be seen that the blow mold assemblies move in over-all D-shaped paths, respectively, and that neither blow mold assembly travels to or through the common injection station. Such motion is necessary in order to avoid interference between the elongated actuating racks 117 of the respective tables 31–31a and the mechanism superimposed on the other table 31a–31, respectively.

Inasmuch as the operation is well illustrated in FIGURES 11 through 14, it is only necessary to consider the operations carried out with one injection head, it being understood that each such injection head, in turn, will go through the same operations as the tables are rotated.

Considering, thus, the operations performed on the head 37, it will be seen that the head 37 is moved to the injection station (FIGURE 13) from its previous location at the ejection station I upon an initial 90-degree displacement of the table 31. When the head 37 is positioned as indicated in FIGURE 13 at the common injection station, the formation of the parison will be carried out as heretofore discussed in connection with the first embodiment of the invention and as illustrated in detail in FIGURES 4 through 7.

Next, the table 31 and the table 31a are indexed in clockwise direction from the position of FIGURE 13 to the position illustrated in FIGURE 14, the parison previously formed at the head 37 being merely transferred in open with the upwardly retracted head to the cooling station Ia, while the head 37b of the table 31a is being positioned at the common injection station.

Once the position of FIGURE 14 has been attained, the blow mold assembly 41 enclosing the previously blown and cooled container carried by the head 37a is opened and transferred diametrically across the plate 31, as indicated in dotted outline in FIGURE 14, into registry with the parison carried by the head 37, and the blow mold 41 is then closed thereon. After blow mold closure, the parison is inflated to the configuration of the final container.

Next, the head 37 is indexed in a clockwise direction to the second cooling station Ib, the blow mold remaining closed on the inflated parison while the head 37a of the table 31 is presented to the common injection station to form the next successive parison.

Next, the head 37 with its parison still enclosed within the blow mold assembly 41 is indexed in a counterclockwise direction to the position of FIGURE 12. When the position of FIGURE 12 is attained, the blow mold assembly 41 is opened and is indexed diametrically across the plate 31 to enclose the blowable parison at the head 37a, this position of the blow mold 41 being indicated in full outline in FIGURE 12. The exposed and inflated article at the head 37 is now ejected by conventional operation of the neck mold and as above described in connection with the embodiment of FIGURES 1 through 8, and the head 37 is now ready for its next presentation to the common injection station (as shown in FIGURE 13) upon the next 90 degree index of the table 31.

It will be appreciated that each 90 degree index of the tables 31, 31a results in the formation of a parison, the ejection of a complete container, the enclosure of a previously formed parison in a blow mold assembly 41, 41a and the inflation of the enclosed parison, and the continued cooling of a previously enclosed parison.

I claim:

1. In a method of successively making blow molded containers by use of a stationary parison mold, the steps of injection molding a first blowable parison about a parison core pin at the parison mold, aligning the first parison and a blow mold, enclosing the first parison in the blow mold, jointly arcuately displacing the first parison, the parison core pin and the blow mold to a position remote from the parison mold, blow molding the first parison at a point in time following closing of the blow mold, injection molding a second blowable parison about another parison core pin at the parison mold, enclosing the second parison in the same blow mold following transfer of the blow mold diametrically across the table into alignment with the second parison, and arcuately displacing the second parison, said another parison core pin and the blow mold to a position remote from the parison mold.

2. In a method of making a blown plastic article by inflating a parison formed at a parison-forming station which is one of a plurality of stations traversed by an arcuately displaceable table, the steps of forming said parison at said parison-forming station while a sectional blow mold is positioned at another of said stations in surrounding relation to a blown previously formed parison, opening said blow mold, displacing said open blow mold diametrically across said table from said another station to said parison forming station, closing said blow mold into surrounding relation to said parison, inflating said parison interiorly of the surrounding blow mold, and subsequently jointly arcuately displacing said closed blow mold and said inflated parison with said table from said parison forming station to said another station, while a second parison is formed at said parison-forming station.

3. The method of making a blown plastic article by inflating interiorly of a sectional blow mold a parison formed at a parison-forming station which is one of a plurality of stations traversed by an arcuately displaceable table rotationally indexed to said stations in series, comprising the steps of forming said parison, moving a set of opened blow mold sections diametrically across said table the into alignment with said parison, closing said blow mold sections on said parison, subsequently jointly rotationally indexing said table with said blow mold sections in said closed position to accommodate inflation and cooling of said parison therein, and expanding the parison in the blow mold sections subsequent to the closing step.

4. The method as defined in claim 3 wherein the step of closing is performed while the parison is at said parison forming station.

5. The method as defined in claim 3 wherein the step of closing is performed after the parison is moved from the parison forming station by rotationally indexing said table.

6. In a method of making a blown plastic article by inflating a parison formed at a parison-forming station which is one of a plurality of stations traversed by an arcuately displaceable table, the steps of forming said parison at said parison-forming station while a blow mold is positioned at another of said stations, arcuately displacing said table to move said parison from said parison-forming station and to move said blow mold with said table, displacing said blow mold linearly along a diametrical path across said table into surrounding relation to said parison, inflating said parison interiorly of the surrounding blow mold, and subsequently jointly arcuately displacing said blow mold and said inflated parison with said table to provide an extended cooling period for said blown parison while a second parison is formed at said parison-forming station.

7. In a continuous method of making plastic containers having an injection molded finish and blow molded body, the steps of (a) arcuately displacing a pair of spaced turntables each having a plurality of heads in timed relation at predetermined intervals through separate travel paths, which paths overlap at an essentially stationary parison forming station, each turntable having at least one injection mold vertically displaceable with each head, the heads of each turntable being offset essentially 180° with respect to each other, (b) indexing the timed displacement of one turntable to be essentially 90° out of phase with respect to the timed displacement of the other head so that only one head of one turntable alternately is positioned at the parison forming station at any one time, (c) serially forming (1) a container finish in the injection mold position at the parison forming station and (2) a body parison of the container at the parison forming station, (d) blow molding each body parison formed by step (c) to form a container within a blow mold displaceable with the turntable with which it is associated, each such turntable having at least one blow mold, (e) displacing each parison enclosing blow mold successively along alternate ones of said separate travel paths to accommodate a period of cooling as steps (c) and (d) are being successively performed in conjunction with alternate ones of said injection molds carried by said turntables and alternately positioned at the parison forming station, and (f) thereafter serially ejecting the formed containers following cooling.

8. In an apparatus for blow molding a container or the like having a table arcuately displaceable to a pair of container-forming positions including a parison-forming position and also having a pair of container finish-defining molds movable with said table, the improvements of a pair of fixed linear guide tracks extending diametrically across said table between said pair of container-forming positions, a blow mold section mounted on each of said tracks, respectively, for movement therealong, means for moving said blow mold sections relative to said tracks to open and closed positions, means for moving said blow mold sections along said tracks and relative to said table when said sections are in their open position, means interconnecting said blow mold sections and said finish-defining molds for joint movement with said table when said blow mold sections are closed, and means for rotating said table.

9. In an apparatus for blow molding a container or the like having a table arcuately displaceable to a pair of container-forming positions including a parison-forming position and a cooling station, said table also having a pair of diametrically spaced container finish-defining molds movable with said table, the improvements of a pair of linear guide tracks secured to and extending along a diameter of said table between said finish-defining molds thereon, a blow mold section mounted on each of said tracks for movement therealong relative to said table and between said finish-defining molds, means for moving said blow mold sections relative to said tracks to open and closed positions, means for moving said blow mold sections along said tracks when said sections are in their open positions from registry with one of said finish-defining molds to the other such mold, and means interconnecting said blow mold sections and said finish-defining molds for joint movement with said table from said parison-forming position to said cooling station when said blow mold sections are closed, and means for rotating said table.

10. Apparatus for blow molding a plastic article having an injection molded portion and a blow molded portion comprising an injection station including means communicating with a source of plasticized material, an arcuately displaceable table, first and second sets of injection molds mounted at diametrically spaced apart positions on said table and movable therewith, respectively, from a position aligned with said injection station to a position remote therefrom, a blow mold having sections movable relative to one another to open and closed positions, means mounting said blow mold on said table for diametrical linear movement across said table between said first injection mold set and said second injection mold set when said sections are open and means accommodating joint blow mold-table movement when said blow mold sections are closed, and means for rotating said table.

11. In an apparatus for blow molding a container or the like, a pair of peripherally overlapping rotatable tables each arcuately displaceable to a plurality of container forming positions including a parison-forming position aligned with the location at which said tables overlap, a plurality of container finish-defining molds mounted on and movable with each of said tables, a pair of linear guide tracks on each of said tables and extending along a diameter of each table, respectively, a set of blow mold sections mounted on each of said pair of tracks for movement therealong, the sections on each table cooperatively defining a cavity conforming to the blow molded portion of said container, means for moving said blow mold sections relative to said tracks and relative to one another to open and closed positions, means for actuating each set of said blow mold sections along said tracks when said sections are the blow mold sections of each set in their open positions, respectively, and means interconnecting each set of said blow mold sections and said finish-defining molds on the same table for joint movement with said table when said blow mold sections are closed.

12. In an apparatus for blow molding a container or the like, a pair of peripherally overlapping rotatable tables each arcuately displaceable to a plurality of container forming positions including a single common parison-forming position aligned with the location at which said tables overlap, a pair of container finish-defining molds mounted on and movable with each of said tables, means on each of said tables defining a guide path extending along a diameter of each table, respectively, a separable blow mold mounted on each said path-defining means for movement therealong, respectively, the blow mold on each table defining a cavity conforming to the blow molded portion of said container, means for moving said blow molds along said paths, means for opening and closing said blow molds, respectively, and means interconnecting each blow mold and said finish-defining molds on the same table for joint movement with said table.

References Cited
UNITED STATES PATENTS

| | | | |
|---|---|---|---|
| 3,204,018 | 8/1965 | Hagen | 264—99 |
| 3,212,130 | 10/1965 | Elphee. | |
| 3,305,890 | 2/1967 | Senior et al. | 264—97 |
| 3,327,035 | 6/1967 | Parfrey. | |

ROBERT F. WHITE, *Primary Examiner.*

T. J. CARVIS, *Assistant Examiner.*

U.S. Cl. X.R.

18—5

PO-1050
(5/69)

UNITED STATES PATENT OFFICE
CERTIFICATE OF CORRECTION

Patent No. 3,453,353          Dated July 1, 1969

Inventor(s) Lawrence D. Ninneman

It is certified that error appears in the above-identified patent and that said Letters Patent are hereby corrected as shown below:

In claim 3, column 10, line 31, the word "the" should read ---and---.

SIGNED AND
SEALED

NOV 4 1969

(SEAL)
Attest:

Edward M. Fletcher, Jr.          WILLIAM E. SCHUYLER, JR.
Attesting Officer          Commissioner of Patents